(12) United States Patent
Jung et al.

(10) Patent No.: US 10,113,063 B2
(45) Date of Patent: Oct. 30, 2018

(54) HYDROLYSIS-STABLE POLYCARBONATE-POLYESTER COMPOSITIONS

(71) Applicant: Covestro Deutschland AG, Leverkusen (DE)

(72) Inventors: Mathieu Jung, Düsseldorf (DE); Ralf Hufen, Duisburg (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/310,422

(22) PCT Filed: May 11, 2015

(86) PCT No.: PCT/EP2015/060282
§ 371 (c)(1),
(2) Date: Nov. 10, 2016

(87) PCT Pub. No.: WO2015/173162
PCT Pub. Date: Nov. 19, 2015

(65) Prior Publication Data
US 2017/0073516 A1    Mar. 16, 2017

(30) Foreign Application Priority Data
May 13, 2014 (EP) .................................... 14168116

(51) Int. Cl.
*C08L 69/00* (2006.01)

(52) U.S. Cl.
CPC ........... *C08L 69/00* (2013.01); *C08L 2205/03* (2013.01)

(58) Field of Classification Search
CPC ........... C08L 51/04; C08L 69/00; C08L 67/00
See application file for complete search history.

(56) References Cited

U.S. PATENT DOCUMENTS

| 5,658,627 | A | 8/1997 | Fujimaki et al. |
| 6,528,612 | B1 * | 3/2003 | Brenner ................. C08G 63/20 528/271 |
| 8,071,694 | B2 | 12/2011 | Yu et al. |
| 2002/0161113 | A1 * | 10/2002 | Dvornic .................... C08F 8/32 525/91 |
| 2008/0139712 | A1 | 6/2008 | Scherzer et al. |

OTHER PUBLICATIONS

International Search Report and Written Opinion for International Application No. PCT/EP2015/060282, European Patent Office, dated Aug. 18, 2015.

* cited by examiner

*Primary Examiner* — Peter D. Mulcahy
(74) *Attorney, Agent, or Firm* — K&L Gates LLP

(57) ABSTRACT

Compositions comprising
A) 50 to 95 parts by weight of at least one polymer selected from the group consisting of aromatic polycarbonate and aromatic polyestercarbonate,
B) 5 to 50 parts by weight of at least one branched polyester, the polyester being derived from succinic acid and optionally further dicarboxylic acids and aliphatic, cycloaliphatic or araliphatic diols,
C) 0 to 20 parts by weight of graft polymer,
D) 0 to 20 parts by weight of vinyl (co)polymer and/or polyalkylene terephthalate,
E) 0.0 to 30 parts by weight of additives,
the parts by weight being standardized to the total weight of the composition
and also the use of these hydrolysis-stable polycarbonate/polyester compositions for producing shaped bodies, and the shaped bodies themselves, where the polyester in the composition can be obtained or prepared preferably from renewable raw materials.

13 Claims, No Drawings

HYDROLYSIS-STABLE POLYCARBONATE-POLYESTER COMPOSITIONS

CROSS-REFERENCE TO RELATED APPLICATIONS

This application is a U.S. national stage application, filed under 35 U.S.C. § 371, of PCT/EP2015/060282, which was filed on May 11, 2015, and which claims priority to EP Patent Application No. EP 14168116.3, which was filed on May 13, 2014, the contents of each of which are incorporated by reference into this specification.

The present invention relates to hydrolysis-stable polycarbonate/polyester compositions having good flow behaviour, high notched impact strength and an increased modulus of elasticity in tension, for which the polyester is branched and is derived from succinic acid and optionally further dicarboxylic acids and aliphatic, cycloaliphatic or araliphatic diols, and also to the use of these hydrolysis-stable polycarbonate/polyester compositions for producing shaped bodies, and to the shaped bodies themselves.

JP 07-324159 describes a polycarbonate composition with an aliphatic polyester, exhibiting improved flowability with unchanged mechanical properties. No details are disclosed concerning the stability towards hydrolysis, however. Aliphatic polyesters specified are polyethylene succinate and polybutylene succinate, but not branched polyesters of succinic acid.

JP 2011-016960 describes a composition of polycarbonate, aliphatic polyester and an ethylene-glycidyl methacrylate copolymer and styrene polymer. A preferred aromatic polyester is specified as polybutylene succinate. The copolymer improves the toughness. However, there are no references to improved hydrolysis properties or increased modulus of elasticity in tension. Branched polyesters of succinic acid are likewise not mentioned.

JP 2005-008671 describes compositions of polycarbonate and aliphatic polyestercarbonates, which are distinguished by good tensile strength and processing properties and also by biodegradability. The polyestercarbonate is prepared by a reaction of oligomeric butylene succinate with diphenyl carbonate. There are no references, however, to enhanced hydrolysis properties, increased modulus of elasticity in tension, or improved notched impact strength. Branched polyesters of succinic acid are likewise not mentioned.

U.S. Pat. No. 8,021,864 describes the preparation of aliphatic polyesters based on renewable raw materials and a possible composition thereof with engineering polymers. But there are no references to improvements in the hydrolysis stability, the flow behaviour, the notched impact strength, or the modulus of elasticity in tension. Polycarbonate compositions with branched polyesters of succinic acid are likewise not mentioned.

EP 0707047 A2 describes shaped bodies produced from branched and unbranched succinic acid polyesters. No compositions are disclosed, however, comprising polycarbonates as further thermoplastics, and also no information is disclosed concerning stability towards hydrolysis, notched impact strength, and modulus of elasticity in tension.

U.S. Pat. No. 8,071,694 describes mixtures of polycarbonate, aliphatic polyesters and, optionally, polylactic acid. A particular polyester disclosed is polybutylene succinate. Good mechanical properties, flowability and heat distortion resistance are described. Compositions with branched polyesters of succinic acid are not explicitly stated, and effective hydrolysis properties are achieved only through corresponding additives.

While plastics have increasingly replaced metals and wood in many areas of industry and of everyday life, and while there is intense work on the improvement in the properties of plastics and also on the opening-up of new territories for their application, a large part of these plastics is based on raw materials that are not renewable, such as petroleum, the reserves of which are finite.

Recent years have therefore seen on the one hand the development of methods for the recycling of plastics, and on the other hand of plastics based on renewable raw materials, examples being polylactic acid (PLA) or polybutylene succinate (PBS).

A problem here, however, is that these plastics often still do not attain the specifications and properties of the established materials, especially a sufficient stability towards hydrolysis.

Thus it is known, for example, that with PC/PBS (polycarbonate/polybutylene succinate) blends, a composition can be achieved that has high heat distortion resistance and impact strength. In general, however, these blends exhibit low hydrolysis resistance and reduced modulus of elasticity in tension, which is inadequate for the desired areas of application.

It is an object of the present invention, therefore, to provide polycarbonate compositions with polyesters which include succinic acid as a monomer unit (dicarboxylic acid) and which feature a combination of improved hydrolysis resistance, good flow behaviour, high notched impact strength and high modulus of elasticity in tension.

It has now surprisingly been found that the compositions or moulding compounds comprising polycarbonate and branched polyesters which include succinic acid as a monomer unit (dicarboxylic acid) lead to blends having the desired properties.

The compositions of the present invention comprise
A) 50 to 95 parts by weight, preferably 60 to 90 parts by weight, more preferably 65 to 85 parts by weight of aromatic polycarbonate,
B) 5 to 50 parts by weight, preferably 10 to 40 parts by weight, more preferably 15 to 35 parts by weight of branched polyester, the polyester being derived from succinic acid and optionally further dicarboxylic acids and aliphatic, cycloaliphatic or araliphatic diols,
C) 0 to 20 parts by weight, preferably 0 to 15 parts by weight, more preferably 0 to 10 parts by weight of graft polymer,
D) 0 to 20 parts by weight, preferably 0 to 15 parts by weight, more preferably 0 to 10 parts by weight of vinyl (co)polymer or polyalkylene terephthalate,
E) 0 to 30 parts by weight, preferably 0.1 to 15.0 parts by weight, more preferably 0.2 to 5.0 parts by weight of additives,
the parts by weight being standardized to the total weight of the composition. This means that the sum of the parts by weight of the components A) to E) in the composition is standardized to 100.

In a further embodiment, the compositions consist only of components A-E.

Described hereinbelow are preferred embodiments 1 to 21 of the present invention:
1. Compositions comprising
A) 50 to 95 parts by weight of at least one polymer selected from the group consisting of aromatic polycarbonate and aromatic polyestercarbonate, B) 5 to 50 parts by weight of at least one branched polyester, the polyester being derived from succinic acid and optionally further dicarboxylic acids and aliphatic, cycloaliphatic or araliphatic diols,
C) 0 to 20 parts by weight of graft polymer,
D) 0 to 20 parts by weight of vinyl (co)polymer and/or polyalkylene terephthalate,
E) 0 to 30 parts by weight of additives, the parts by weight being standardized to the total weight of the composition.

2. Compositions comprising
A) 60 to 90 parts by weight of at least one polymer selected from the group consisting of aromatic polycarbonate and aromatic polyestercarbonate,
B) 10 to 40 parts by weight of at least one branched polyester, the polyester being derived from succinic acid and optionally further dicarboxylic acids and aliphatic, cycloaliphatic or araliphatic diols,
C) 0 to 15 parts by weight of graft polymer,
D) 0 to 15 parts by weight of vinyl (co)polymer and/or polyalkylene terephthalate,
E) 0.1 to 15 parts by weight of additives,
the parts by weight being standardized to the total weight of the composition.

3. Compositions comprising
A) 65 to 85 parts by weight of at least one polymer selected from the group consisting of aromatic polycarbonate and aromatic polyestercarbonate,
B) 15 to 35 parts by weight of at least one branched polyester, the polyester being derived from succinic acid and optionally further dicarboxylic acids and aliphatic, cycloaliphatic or araliphatic diols,
C) 0 to 10 parts by weight of graft polymer,
D) 0 to 10 parts by weight of vinyl (co)polymer and/or polyalkylene terephthalate,
E) 0.2 to 5 parts by weight of additives,
the parts by weight being standardized to the total weight of the composition.

4. Compositions according to any of the preceding embodiments, characterized in that the polyester is derived only from succinic acid and aliphatic, cycloaliphatic or araliphatic diols.

5. Compositions according to any of the preceding embodiments, characterized in that the diols are aliphatic.

6. Compositions according to any of the preceding embodiments, characterized in that the diol is butanediol.

7. Compositions according to any of the preceding embodiments, characterized in that in the case of component B, 0.1 to 0.9 wt % of branching agent, based on component B, is used.

8. Compositions according to any of the preceding embodiments, characterized in that the polyester is branched by addition of 1,1,1-trimethylolpropane.

9. Compositions according to embodiment 8, characterized in that 0.2 to 0.6 wt % of branching agent, based on component B, is used.

10. Compositions according to embodiment 8, characterized in that 0.3 to 0.5 wt % of branching agent, based on component B, is used.

11. Compositions according to any of the preceding embodiments, characterized in that the weight-average molecular weights Mw of component B are between 40 and 500 kg/mol, determined by gel permeation chromatography against polystyrene as reference.

12. Compositions according to any of the preceding embodiments, characterized in that the weight-average molecular weights Mw of component B are between 80 and 400 kg/mol, determined by gel permeation chromatography against polystyrene as reference.

13. Compositions according to any of the preceding embodiments, characterized in that component B has a glass transition temperature of −45° C. to 0° C.

14. Compositions according to any of the preceding embodiments, characterized in that component B has a melting point of 90° C. to 125° C.

15. Compositions according to any of the preceding embodiments, characterized in that the acid component of the polyester originates from renewable raw materials.

16. Compositions according to any of the preceding embodiments, comprising as component C one or more graft polymers of
C.1 30 to 90 wt % of at least one vinyl monomer on
C.2 70 to 10 wt % of at least one graft base selected from the group consisting of diene rubbers, EP(D)M rubbers (i.e. those based on ethylene/propylene and optionally diene), acrylate rubbers, polyurethane rubbers, silicone rubbers, silicone acrylate rubbers, chloroprene and ethylene/vinyl acetate rubbers, and also polybutadiene-styrene rubber.

17. Compositions according to any of the preceding embodiments, where ABS polymers are used as component C, having been prepared in an emulsion polymerization process by redox initiation with an initiator system composed of organic hydroperoxide and ascorbic acid.

18. Compositions according to any of the preceding embodiments, comprising as component E at least one additive selected from the group encompassing flame retardant synergists and anti-dripping agents, lubricants and mould release agents, nucleating agents, stabilizers, antistats, dyes, pigments and fillers and reinforcing substances.

19. Compositions according to any of the preceding embodiments, characterized in that the weight-average molecular weights Mw of component A are between 23 000 and 30 000 g/mol, determined by gel permeation chromatography against polystyrene as reference.

20. Use of compositions according to any of embodiments 1 to 19 for producing injection-moulded or thermoformed shaped bodies.

21. Shaped bodies obtainable from compositions according to any of embodiments 1 to 19.

In a further embodiment the composition is free from rubber-modified graft polymers.

In a further embodiment the composition is free from vinyl (co)polymers, more particularly SAN (styrene-acrylonitrile) and polyalkylene terephthalates.

In a further embodiment the composition is free from vinyl (co)polymers and rubber-modified graft polymers.

In a further embodiment the composition is free from flame retardants.

The individual ranges of preference identified above for various components can be combined freely with one another, and with particular preference equivalent levels of retreat are combined with one another.

Component A

Aromatic polycarbonates and aromatic polyestercarbonates in accordance with component A which are suitable in accordance with the invention are known from the literature or preparable by processes known from the literature (for preparation of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for preparation of aromatic polyestercarbonates, for example DE-A 3 077 934).

Preferred modes of preparation of the polycarbonates for use in accordance with the invention, including the polyestercarbonates, are the known interfacial process and the known melt transesterification process (cf. e.g. WO 2004/063249 A1, WO 2001/05866 A1, WO 2000/105867, U.S. Pat. No. 5,340,905, U.S. Pat. No. 5,097,002, U.S. Pat. No. 5,717,057).

Aromatic polycarbonates and polyestercarbonates are prepared, for example, by reacting diphenols with carbonic halides, preferably phosgene, and/or with aromatic dicarbonyl dihalides, preferably benzenedicarbonyl dihalides, by the interfacial process, optionally using chain terminators, for example monophenols, and optionally using trifunctional or more than trifunctional branching agents, for example triphenols or tetraphenols. Preparation is likewise possible via a melt polymerization process through reaction of diphenols with, for example, diphenyl carbonate.

Diphenols for preparation of the aromatic polycarbonates and/or aromatic polyestercarbonates are preferably those of the formula (I)

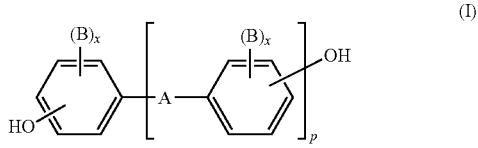

where
A is a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, onto which may be fused further aromatic rings optionally containing heteroatoms,
or a radical of the formula (II) or (III)

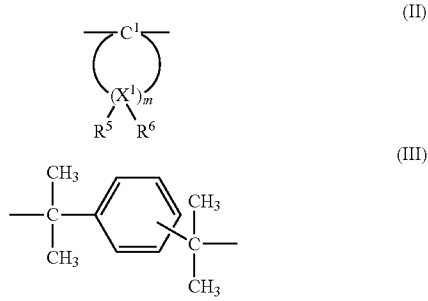

B in each case is $C_1$- to $C_{12}$-alkyl, preferably methyl, halogen, preferably chlorine and/or bromine,
x in each case is independently 0, 1 or 2,
p is 1 or 0, and
$R^5$ and $R^6$ can be chosen individually for each $X^1$, and are each independently hydrogen or $C_1$- to $C_6$-alkyl, preferably hydrogen, methyl or ethyl,
$X^1$ is carbon and
m is an integer from 4 to 7, preferably 4 or 5, with the proviso that $R^5$ and $R^6$ on at least one $X^1$ atom are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulphoxides, bis(hydroxyphenyl) ketones, bis(hydroxyphenyl) sulphones and α,α-bis(hydroxyphenyl)diisopropylbenzenes, and the ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulphide, 4,4'-dihydroxydiphenyl sulphone and the di- and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

It is possible to use the diphenols individually or in the form of any desired mixtures. The diphenols are known from the literature or obtainable by processes known from the literature.

Examples of chain terminators suitable for the preparation of the thermoplastic aromatic polycarbonates include phenol, p-chlorophenol, p-tert-butylphenol or 2,4,6-tribromophenol, but also long-chain alkylphenols such as 4-[2-(2,4,4-trimethylpentyl)]phenol, 4-(1,3-tetramethylbutyl) phenol according to DE-A 2 842 005 or monoalkylphenols or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl) phenol. The amount of chain terminators to be used is generally between 0.5 mol % and 10 mol %, based on the molar sum of the diphenols used in each case.

The thermoplastic aromatic polycarbonates may be branched in a known manner, preferably through the incorporation of 0.05 to 2.0 mol %, based on the sum total of the diphenols used, of trifunctional or more than trifunctional compounds, for example those having three or more phenolic groups.

Both homopolycarbonates and copolycarbonates are suitable. For preparation of inventive copolycarbonates in accordance with component A, it is also possible to use 1 to 25% by weight, preferably 2.5 to 25% by weight, based on the total amount of diphenols to be used, of polydiorganosiloxanes having hydroxyaryloxy end groups. These are known (U.S. Pat. No. 3,419,634) and are preparable by processes known from the literature. The preparation of polydiorganosiloxane-containing copolycarbonates is described in DE-A 3 334 782.

Preferred polycarbonates are, as well as the bisphenol A homopolycarbonates, the copolycarbonates of bisphenol A with up to 15 mol %, based on the molar sums of diphenols, of other diphenols specified as preferred or particularly preferred, especially 2,2-bis(3,5-dibromo-4-hydroxyphenyl) propane.

Aromatic dicarbonyl dihalides for preparation of aromatic polyestercarbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio between 1:20 and 20:1.

In the preparation of polyestercarbonates, a carbonic halide, preferably phosgene, is also additionally used as a bifunctional acid derivative.

Useful chain terminators for the preparation of the aromatic polyestercarbonates include, apart from the monophenols already mentioned, the chlorocarbonic esters thereof and the acid chlorides of aromatic monocarboxylic acids, which may optionally be substituted by $C_1$- to $C_{22}$-alkyl groups or by halogen atoms, and aliphatic $C_2$- to $C_{22}$-monocarbonyl chlorides.

The amount of chain terminators in each case is 0.1 to 10 mol %, based on moles of diphenol in the case of the phenolic chain terminators and on moles of dicarbonyl dichloride in the case of monocarbonyl chloride chain terminators.

The aromatic polyestercarbonates may also contain incorporated aromatic hydroxycarboxylic acids.

The aromatic polyestercarbonates may be either linear or branched in a known manner (see DE-A 2 940 024 and DE-A 3 007 934).

Branching agents used may, for example, be tri- or multifunctional carbonyl chlorides, such as trimesyl trichloride, cyanuric trichloride, 3,3',4,4'-benzophenonetetracarbonyl tetrachloride, 1,4,5,8-naphthalenetetracarbonyl tetrachloride or pyromellitic tetrachloride, in amounts of 0.01 to 1.0 mol % (based on dicarbonyl dichlorides used), or tri- or multifunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol %, based on diphenols used. Phenolic branching agents may be initially charged together with the diphenols; acid chloride branching agents may be introduced together with the acid dichlorides.

The proportion of carbonate structural units in the thermoplastic aromatic polyestercarbonates may vary as desired. Preferably, the proportion of carbonate groups is up to 100 mol %, especially up to 80 mol %, more preferably up to 50 mol %, based on the sum total of ester groups and carbonate groups. Both the ester fraction and the carbonate fraction of the aromatic polyestercarbonates may be present in the form of blocks or in random distribution in the polycondensate.

The relative solution viscosity ($\eta_{rel}$) of the aromatic polycarbonates and polyestercarbonates is preferably in the range of 1.18 to 1.4, more preferably in the range of 1.20 to 1.32 (measured on solutions of 0.5 g of polycarbonate or polyestercarbonate in 100 ml of methylene chloride solution at 25° C.). The weight-average molecular weight Mw of the aromatic polycarbonates and polyestercarbonates is preferably in the range from 15 000 to 35 000 g/mol, more preferably in the range from 20 000 to 33 000 g/mol, very preferably 23 000 to 30 000 g/mol, determined by GPC (Gel Permeation Chromatography in methylene chloride using polycarbonate as standard).

Component B

As component B), the compositions in accordance with the invention comprise a branched polyester or a mixture of two or more different branched polyesters.

Polyesters in the sense of the invention are reaction products of succinic acid or reactive derivatives thereof and aliphatic, cycloaliphatic or araliphatic diols, and mixtures of these reaction products.

The succinic esters are branched through incorporation of relatively small amounts of tri- or tetrahydric alcohols or tri- or tetrabasic carboxylic acid, as described for example in DE 1900270 A1 and U.S. Pat. No. 3,692,744 (A). Examples of preferred branching agents are trimesic acid, trimellitic acid, trimethylolethane, trimethylolpropane and pentaerythritol.

Particularly preferred as branching agent is trimethylolpropane, most preferably 1,1,1-trimethylolpropane.

It is advisable to use not more than 1 wt % of the branching agent, based on the polyester.

It is preferred to use 0.1 to 0.9 wt %, more preferably 0.2 to 0.6 wt % and very preferably 0.3 to 0.5 wt % of the branching agent.

One particularly preferred embodiment uses 0.2 to 0.6 wt % of 1,1,1-trimethylolpropane, most preferably 0.3 to 0.5 wt % of 1,1,1-trimethylolpropane.

Preferred polyesters may be prepared from succinic acid (or reactive derivatives thereof) or from mixtures of succinic acid and up to 20 mol % of radicals of other aromatic dicarboxylic acids having 8 to 14 C atoms or of aliphatic dicarboxylic acids having 4 to 12 C atoms, such as radicals of phthalic acid, isophthalic acid, naphthalene-2,6-dicarboxylic acid, 4,4'-biphenyldicarboxylic acid, adipic acid, sebacic acid, azelaic acid, cyclohexanediacetic acid, cyclohexanedicarboxylic acid, and aliphatic diols having 2 to 10 C atoms, for example ethanediol, propylene glycol, butanediol or pentanediol, by known methods such as condensation polymerization of dicarboxylic acid compounds or functional derivatives such as anhydrides or chlorides on the one hand and diols on the other. The condensation polymerization may be carried out in solution, in the melt or in solid phase, or in a combination of reaction steps in different phases.

The branched polyester polymer is preferably selected from the group consisting of polyethylene succinate, polyethylene succinate-co-adipate, polyethylene succinate-co-terephthalate, polybutylene succinate, polybutylene succinate-co-adipate and polybutylene succinate-co-terephthalate.

Particularly preferred are succinic esters prepared solely from succinic acid or reactive derivatives thereof (e.g. dimethyl esters or anhydrides) and from an aliphatic diol and also branching agent.

In a further-preferred embodiment, the aliphatic diols are alkanediols having 2 to 10 C atoms. Especially preferred are diols selected from the group encompassing ethanediol, propanediol, butanediol and pentanediol, with butanediol being the most preferred.

In the most preferred embodiment, a branched polyester of succinic acid and butanediol is used.

In one preferred embodiment, coupling agents are used in order to increase the molecular weight. Examples of such coupling agents are 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate and isophorone diisocyanate. Preference is given to utilizing hexamethylene diisocyanate and isophorone diisocyanate.

The polyesters of the invention are prepared as described in EP 0707047 A2, for example.

The succinic esters used with preference possess weight-average molecular weights Mw of 10 to 1500 kg/mol (determined by gel permeation chromatography against polystyrene as reference), preferably 15 to 750 kg/mol, more preferably 40 to 500 kg/mol and very preferably 80 to 400 kg/mol.

Succinic acid used as acid component may originate from biological sources, i.e. may be obtained from renewable raw materials, by means of fermentation of glucose or from hydrolysates of biomass, for example.

In one particularly preferred embodiment, the polyester is a polybutylene succinate which is branched with 0.3 to 0.5 wt % of 1,1,1-trimethylolpropane and possesses a weight-average molecular weight of 80 to 400 kg/mol (determined by gel permeation chromatography against polystyrene as reference, dichloromethane solvent, 6 g/l concentration).

In the preparation, initially, the corresponding dicarboxylic diester is customarily formed in an esterification or transesterification reaction at temperatures of around 150° C. to 300° C., and is then subjected to polycondensation at increasing temperature under reduced pressure, with the corresponding hydroxyl compounds and/or water being removed. The last stages of the reaction are carried out generally under high vacuum (<10 mm mercury column), in order to prepare a polyester polymer with high molecular weight.

Both reaction steps may optionally be carried out using esterification catalysts and/or transesterification catalysts and/or polycondensation catalysts. Customary catalysts include Ti, Zr, Sn and Sb compounds for the esterification, Mn, Co and Zn compounds for the transesterification, and Sb, Ti, Pb, Ge, Zn and Sn compounds for the polycondensation, the compounds being selected in general from the group encompassing oxides, alkoxides, acetates and carboxylates. The metal content of the catalyst is customarily between 20 and 500 ppm, based on 100 parts by weight of polyester polymer.

Component B preferably has a glass transition temperature of −50° C. to 90° C., more preferably −45° C. to 0° C.

Component B preferably possesses a melting point of 80° C. to 260° C., more preferably of 85° C. to 180° C. and more preferably still of 90° C. to 125° C.

The glass transition temperature is determined according to DIN 53765 at a heating rate of 20 K using nitrogen inert gas, the glass transition temperature being determined as the point of intersection of the middle line between the extrapolated baselines before and after the glass transition of the measurement plot.

Component C

Component C comprises one or more graft polymers of
C.1 5 to 95, preferably 30 to 90, wt % of at least one vinyl monomer on
C.2 95 to 5, preferably 70 to 10, wt % of at least one graft base selected from the group consisting of diene rubbers, EP(D)M rubbers (i.e. those based on ethylene/propylene and optionally diene), acrylate rubbers, polyurethane rubbers, silicone rubbers, silicone acrylate rubbers, chloroprene and ethylene/vinyl acetate rubbers, and also polybutadiene-styrene rubber.

The graft base C.2 generally has a median particle size ($d_{50}$) of 0.05 to 10 preferably 0.1 to 5 μm, more preferably 0.2 to 1 μm.

Monomers C.1 are preferably mixtures of
C.1.1 50 to 99 parts by weight of vinylaromatics and/or ring-substituted vinylaromatics (such as styrene, α-methylstyrene, p-methylstyrene, p-chlorostyrene) and/or ($C_1$-$C_8$)-alkyl (meth)acrylates, such as methyl (meth)acrylate, ethyl (meth)acrylate, and
C.1.2 1 to 50 parts by weight of vinyl cyanides (unsaturated nitriles such as acrylonitrile and methacrylonitrile) and/or ($C_1$-$C_8$)-alkyl (meth)acrylates, such as methyl methacrylate, n-butyl acrylate, tert-butyl acrylate, and/or derivatives (such as anhydrides and imides) of unsaturated carboxylic acids, for example maleic anhydride and N-phenylmaleimide.

Preferred monomers C.1.1 are selected from at least one of the monomers styrene, α-methylstyrene and methyl methacrylate; preferred monomers C.1.2 are selected from at least one of the monomers acrylonitrile, maleic anhydride and methyl methacrylate.

The characterization of the constituent "(meth)" in parentheses with acrylates denotes the optional presence of this constituent.

Preferred graft bases C.2 are silicone acrylate rubbers, diene rubbers (based on butadiene and isoprene, for example), or mixtures of diene rubbers. A diene rubber in the sense of the invention also includes copolymers of diene rubbers or mixtures thereof with further copolymerizable monomers (e.g. as per C.1.1 and C.1.2).

The graft bases C.2 generally have a glass transition temperature of <10° C., preferably <0° C., more preferably <−10° C.

In one embodiment the monomer C.1 is polymethylmethacrylate (PMMA), in which case with further preference the graft base C.2 is a silicone acrylate rubber.

Particularly preferred polymers C are, for example, ABS polymers (emulsion, bulk and suspension ABS), as described, for example, in DE-A 2 035 390 (=U.S. Pat. No. 3,644,574) or in DE-A 2 248 242 (=GB-PS 1 409 275), or in Ullmann's Enzyklopadie der Technischen Chemie, Vol. 19 (1980), p. 280 ff.

The gel content of the graft base C.2 is preferably at least 20 wt %, preferably at least 40 wt % (measured in toluene) in the case of graft bases C.2 prepared in an emulsion polymerization.

The graft polymer of components C.1 and C.2 preferably has a core-shell structure, with component C.1 forming the shell and component C.2 forming the core (see, for example, Ullmann's Encyclopedia of Industrial Chemistry, VCH-Verlag, vol. A21, 1992, page 635 and page 656).

The graft copolymers C are prepared by radical polymerization, for example by emulsion, suspension, solution or bulk polymerization, preferably by emulsion or bulk polymerization.

Particularly suitable graft rubbers are also ABS polymers, which are prepared in an emulsion polymerization process by redox initiation with an initiator system composed of organic hydroperoxide and ascorbic acid according to U.S. Pat. No. 4,937,285.

Since, as is well known, the graft monomers are not necessarily grafted completely onto the graft base in the grafting reaction, according to the invention, graft polymers C are also understood to mean those products which are obtained through (co)polymerization of the graft monomers in the presence of the graft base and which are also obtained during workup.

Suitable acrylate rubbers C.2 of the polymers C are preferably polymers of alkyl acrylates, optionally with up to 40 wt %, based on C.2, of other polymerizable, ethylenically unsaturated monomers. The preferred polymerizable acrylic esters include $C_1$-$C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, and also mixtures of these monomers.

For crosslinking, it is possible to copolymerize monomers having more than one polymerizable double bond. Preferred examples of crosslinking monomers are esters of unsaturated monocarboxylic acids having 3 to 8 carbon atoms and unsaturated monohydric alcohols having 3 to 12 carbon atoms or of saturated polyols having 2 to 4 OH groups and 2 to 20 carbon atoms, for example ethylene glycol dimethacrylate, allyl methacrylate; polyunsaturated heterocyclic compounds, for example trivinyl cyanurate and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of the crosslinked monomers is preferably 0.02 to 5, especially 0.05 to 2, wt %, based on the graft base C.2. In the case of cyclic crosslinking monomers having at least three ethylenically unsaturated groups, it is advantageous to restrict the amount to below 1 wt % of the graft base C.2.

Preferred "other" polymerizable, ethylenically unsaturated monomers which, alongside the acrylic esters, may optionally serve for preparation of the graft base C.2 are, for example, acrylonitrile, styrene, α-methylstyrene, acrylamides, vinyl $C_1$-$C_6$-alkyl ethers, methyl methacrylate, butadiene. Preferred acrylate rubbers as graft base C.2 are emulsion polymers having a gel content of at least 60 wt %.

Suitable silicone rubbers C.2 may be prepared by emulsion polymerization, as described, for example, in U.S. Pat. No. 2,891,920 and U.S. Pat. No. 3,294,725. Further suitable graft bases C.2 are silicone rubbers having active grafting sites, as are described in DE-A 3 704 657, DE-A 3 704 655, DE-A 3 631 540 and DE-A 3 631 539.

Also suitable as graft bases C.2 in accordance with the invention are silicone acrylate rubbers. These silicone acrylate rubbers are composite rubbers having active grafting sites, containing 10-90 wt % silicone rubber fraction and 90 to 10 wt % polyalkyl (meth)acrylate rubber fraction, with the two stated rubber components interpenetrating one another in the composite rubber, meaning that they are essentially inseparable from one another. If the proportion of the silicone rubber component in the composite rubber is too high, the fully formulated resin compositions have disadvantageous surface properties and worse colourability. If, on the other hand, the fraction of the polyalkyl (meth)acrylate rubber component in the composite rubber is too high, the impact toughness of the fully formulated resin composition will be adversely affected. Silicone acrylate rubbers are known and described in U.S. Pat. No. 5,807,914, EP 430134 and U.S. Pat. No. 4,888,388, for example. Used with preference is a graft polymer prepared by emulsion polymerization with C.1 being methyl methacrylate and C.2 being silicone acrylate composite rubber.

The gel content of the graft base C.2 is determined at 25° C. in a suitable solvent (M. Hoffmann, H. Krömer, R. Kuhn, Polymeranalytik I und II [Polymer Analysis I and II], Georg Thieme-Verlag, Stuttgart 1977).

The median particle size $d_{50}$ is the diameter above and below which 50 wt % of the particles, respectively, are situated. It can be determined by means of ultracentrifuge measurement (W. Scholtan, H. Lange, Kolloid, Z. und Z. Polymere 250 (1972), 782-1796).

Component D

Component D comprises one or more thermoplastic vinyl (co)polymers and/or polyalkylene terephthalates.

Suitable vinyl (co)polymers D are polymers of at least one monomer from the group of vinylaromatics, vinyl cyanides (unsaturated nitriles), ($C_1$-$C_8$)-alkyl (meth)acrylates, unsaturated carboxylic acids and also derivatives (such as anhydrides and imides) of unsaturated carboxylic acids. Especially suitable are (co)polymers of D.1 50 to 99, preferably 60 to 80 parts by weight of vinylaromatics and/or ring-substituted vinylaromatics such as styrene, α-methylstyrene, p-methylstyrene, p-chlorostyrene, and/or ($C_1$-$C_8$)-alkyl (meth)acrylates, such as methyl methacrylate, ethyl methacrylate, and D.2 1 to 50, preferably 20 to 40 parts by weight of vinyl cyanides (unsaturated nitriles) such as acrylonitrile and methacrylonitrile and/or ($C_1$-$C_8$)-alkyl (meth)acrylates, such as methyl methacrylate, n-butyl acrylate, tert-butyl acrylate, and/or unsaturated carboxylic acids, such as maleic acid, and/or derivatives, such as anhydrides and imides, of unsaturated carboxylic acids, examples being maleic anhydride and N-phenylmaleimide.

The vinyl (co)polymers D are resinous, thermoplastic and rubber-free. Particular preference is given to the copolymer of D.1 styrene and D.2 acrylonitrile.

The (co)polymers D are known and can be prepared by radical polymerization, especially by emulsion, suspension, solution or bulk polymerization. The (co)polymers preferably have average molecular weights Mw (weight average, determined by light scattering or sedimentation) between 15 000 and 200 000 g/mol.

Suitably as component D the compositions in accordance with the invention comprise one or a mixture of two or more different polyalkylene terephthalate(s).

Polyalkylene terephthalates for the purposes of the invention are polyalkylene terephthalates which derive from terephthalic acid (or reactive derivatives thereof, e.g. dimethyl esters or anhydrides) and alkanediols, cycloaliphatic or araliphatic diols and mixtures thereof, based for example on propylene glycol, butanediol, pentanediol, hexanediol, 1,2-cyclohexanediol, 1,4-cyclohexanediol, 1,3-cyclohexanediol, and cyclohexyldimethanol, with the diol component of the invention having more than 2 carbon atoms. Preferred for use accordingly as component D are polybutylene terephthalate and/or polytrimethylene terephthalate, most preferably polybutylene terephthalate.

The polyalkylene terephthalates of the invention, as monomer of the diacid, may also include up to 5 wt % of isophthalic acid.

Preferred polyalkylene terephthalates may be prepared from terephthalic acid (or reactive derivatives thereof) and aliphatic or cycloaliphatic diols having 3 to 21 C atoms by known methods (Kunststoff-Handbuch, vol. VIII, p. 695 ff., Carl-Hanser-Verlag, Munich 1973).

Preferred polyalkylene terephthalates contain at least 80, preferably at least 90 mol %, based on the diol component, of propane-1,3-diol and/or butane-1,4-diol residues.

The preferred polyalkylene terephthalates may contain, as well as terephthalic acid residues, up to 20 mol % of residues of other aromatic dicarboxylic acids having 8 to 14 carbon atoms or of aliphatic dicarboxylic acids having 4 to 12 carbon atoms, such as residues of phthalic acid, isophthalic acid, naphthalene-2,6-dicarboxylic acid, 4,4'-biphenyldicarboxylic acid, succinic acid, adipic acid, sebacic acid, azelaic acid, cyclohexanediacetic acid, cyclohexanedicarboxylic acid.

The preferred polyalkylene terephthalates may contain, as well as propane-1,3-diol and/or butane-1,4-diol residues, up to 20 mol % of other aliphatic diols having 3 to 12 C atoms or cycloaliphatic diols having 6 to 21 C atoms, for example residues of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di((3-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)

propane and 2,2-bis(4-hydroxypropoxyphenyl)propane (DE-A 24 07 674, 24 07 776, 27 15 932).

The polyalkylene terephthalates may be branched through incorporation of relatively small amounts of tri- or tetrahydric alcohols or tri- or tetrabasic carboxylic acid, for example as described in DE-A 19 00 270 and U.S. Pat. No. 3,692,744. Examples of preferred branching agents are trimesic acid, trimellitic acid, trimethylolethane and trimethylolpropane, and pentaerythritol.

It is advisable to use not more than 1 mol % of the branching agent, based on the acid component.

Particular preference is given to polyalkylene terephthalates which have been prepared solely from terephthalic acid or reactive derivatives thereof (e.g. dialkyl esters thereof such as dimethyl terephthalate) and from propane-1,3-diol and/or butane-1,4-diol (polypropylene terephthalate and polybutylene terephthlate), and to mixtures of these polyalkylene terephthalates.

Preferred polyalkylene terephthalates are also copolyesters prepared from at least two of the abovementioned acid components and/or from at least two of the abovementioned alcohol components; particularly preferred copolyesters are poly(propylene-1,3-glycol/butane-1,4-diol) terephthalates.

The polyalkylene terephthalates generally possess an intrinsic viscosity of about 0.4 to 1.5 dl/g, preferably 0.5 to 1.3 dl/g, measured in each case in phenol/o-dichlorobenzene (1:1 part by weight) at 25° C.

In an alternative embodiment, the polyesters prepared in accordance with the invention may also be used in a mixture with other polyesters and/or further polymers, in which case preference is given to using mixtures of polyalkylene terephthalates with other polyesters.

Component E

The composition may comprise further, commercially customary additives under component E, such as flame retardants, flame retardant synergists, anti-dripping agents (for example, compounds from the classes of the fluorinated polyolefins, or of the silicones, and also aramid fibres), lubricants and mould release agents (for example pentaerythritol tetrastearate), nucleating agents, stabilizers, antistats (for example conductive carbon blacks, carbon fibres, carbon nanotubes and also organic antistats such as polyalkylene ethers, alkylsulphonates or polyamide-containing polymers), fillers and reinforcing agents (for example glass fibres or carbon fibres, mica, kaolin, talc, $CaCO_3$ and glass flakes), and also dyes and pigments.

In one particularly preferred embodiment, the composition is free from flame retardants.

Particularly preferred additives used are mould release agents, stabilizers, and also dyes and pigments, with carbon fibres and carbon nanotubes not constituting dyes and pigments in the sense of the present invention, and preferably not being present in the compositions.

Production and Testing of the Moulding Compositions

The thermoplastic moulding compositions of the invention are produced by mixing of the respective constituents in a known manner and by compounding them and extruding them in melt form at temperatures of generally 240° C. to 300° C. in standard apparatus such as internal kneaders, extruders and twin-shaft screw systems.

The individual constituents can be mixed in a known manner, either successively or simultaneously, and either at about 20° C. (room temperature) or at a higher temperature.

Likewise subjects of the invention are methods for producing the moulding compositions, and the use of the moulding compositions for producing shaped bodies, and also the moulded parts themselves.

The moulding compositions of the invention may be used for producing shaped bodies of any kind. These can be produced by injection moulding, extrusion and blow-moulding processes. A further form of processing is the production of shaped bodies by thermoforming from previously produced sheets or films.

Examples of shaped bodies of this kind are films, profiles, all kinds of housing parts, for example for domestic appliances such as television sets, juice presses, coffee machines, mixers; for office equipment such as monitors, flatscreens, notebooks, printers, copiers; sheets, tubes, electrical installation ducts, windows, doors and further profiles for the construction sector (interior fitting and exterior applications), and also electrical and electronic parts such as switches, plugs and sockets, and also bodywork and interior components for utility vehicles, especially for the automotive sector.

The moulding compositions of the invention may also be used, for example, for the production of the following shaped bodies or moulded parts, moreover: interior fitting components for rail vehicles, ships, aircraft, buses and other motor vehicles, housings for electrical appliances containing small-scale transformers, housings for information processing and transmission devices, housings and lining for medical appliances, massage appliances and housings therefor, children's toy vehicles, flat wall elements, housings for safety devices and for television sets, thermally insulated transport containers, moulded parts for sanitary and bathroom equipment, cover grids for blower vents and housing for garden appliances.

The examples which follow serve to elucidate the invention further.

Production and Testing of the Moulding Compositions

In a twin-screw extruder (Werner and Pfleiderer ZSK-25), the feedstocks listed in Table 1 are compounded and pelletized at a speed of 225 rpm and a throughput of 20 kg/h at a machine temperature of 250° C.

The finished pellets are processed in an injection-moulding machine to give appropriate specimens (melt temperature 240° C., mould temperature 80° C., flow front speed 240 mm/s).

The properties of the specimens were characterized by employing the following methods:

Melt viscosity was determined to ISO 11443 (at 260° C.).

The modulus of elasticity in tension is measured to ISO 527-1, and -2 with an extension rate of 1 mm/min.

The melt flowability was assessed via the melt volume flow rate (MVR) measured to ISO 1133 at a temperature of 240° C. with a die load of 5 kg.

Employed as a measure of the hydrolysis resistance of the compositions produced was the change in the MVR as measured to ISO 1133 at 240° C. with a die load of 5 kg on storage of the pellets for 1 day at 95° C. and 100% relative humidity ("HH storage"). The increase in the MVR relative to the MVR prior to the storage in question was calculated as $\Delta MVR(hydr.)$, defined by the formula below:

$$\Delta MVR(hydr.) = \frac{MVR(\text{after } HH \text{ storage}) - MVR(\text{before storage})}{MVR(\text{before storage})} \cdot 100\%$$

Component A1

Linear polycarbonate based on bisphenol A having a relative solution viscosity of $\eta_{rel}=1.30$, measured in $CH_2Cl_2$ as solvent at 25° C. and a concentration of 0.5 g/100 ml.

Component A2

Linear polycarbonate based on bisphenol A having a relative solution viscosity of $\eta_{rel}$=1.32, measured in $CH_2Cl_2$ as solvent at 25° C. and a concentration of 0.5 g/100 ml.

Component B1

Linear polyester of 48 wt % succinic acid, 51 wt % 1,4-butanediol and 1.0 wt % hexamethylene diisocyanate having a weight-average molecular weight Mw of 255 kg/mol (determined by GPC against polystyrene reference, dichloromethane solvent, 6 g/l concentration), trade name Bionolle® 1001 from Showa Denko.

Component B2

Branched polyester of 48.1 wt % succinic acid, 50.7 wt % 1,4-butanediol, 0.8 wt % hexamethylene diisocyanate and 0.4 wt % 1,1,1-trimethylolpropane having a weight-average molecular weight Mw of 245 kg/mol (determined by GPC against polystyrene reference, dichloromethane solvent, 6 g/l concentration), trade name Bionolle® 1903 from Showa Denko.

Component E

Pentaerythrityl Tetrastearate as Lubricant/Mould Release Agent

From Table 1 it is apparent that the compositions of the examples containing branched polyalkylene succinate 1 to 4 achieve the object according to the invention, i.e. exhibit a combination of good hydrolytic stability (≤200% deviation from the original MVR 240° C./5 kg after storage for 1 d/95° C./100% relative humidity), high notched impact toughness (≥20 kJ/m$^2$), high modulus of elasticity in tension, and improved melt viscosity under working conditions, whereas the flowability, tensile strength and hydrolysis resistance do not achieve the requisite level when an unbranched polyalkylene succinate is used. If the fraction of polyester is too large (Comp. 7), the required profile of properties is again not fulfilled.

TABLE 1

Composition and properties of the moulding compositions

| | Comp. 1 | Comp. 2 | Comp. 3 | Comp. 4 | Comp. 5 | Comp. 6 | Ex. 1 | Ex. 2 | Ex. 3 | Ex. 4 | Comp. 7 |
|---|---|---|---|---|---|---|---|---|---|---|---|
| Components (parts by weight) | | | | | | | | | | | |
| A1 | 95.6 | 85.6 | 75.6 | 65.6 | 55.6 | 45.6 | 85.6 | 75.6 | 65.6 | 55.6 | 45.6 |
| A2 | 4.0 | 4.0 | 4.0 | 4.0 | 4.0 | 4.0 | 4.0 | 4.0 | 4.0 | 4.0 | 4.0 |
| B1 | | 10.0 | 20.0 | 30.0 | 40.0 | 60.0 | | | | | |
| B2 | | | | | | | 10.0 | 20.0 | 30.0 | 40.0 | 60.0 |
| E | 0.4 | 0.4 | 0.4 | 0.4 | 0.4 | 0.4 | 0.4 | 0.4 | 0.4 | 0.4 | 0.4 |
| Properties | | | | | | | | | | | |
| Melt viscosity (260° C./1000 s$^{-1}$) [Pas] | 846 | 444 | 299 | 204 | 162 | 133 | 407 | 208 | 146 | 110 | 82 |
| MVR 240° C./5 kg [ccm/10 min] | 3.80 | 4.90 | 5.90 | 8.10 | 13.10 | 23.90 | 5.40 | 7.10 | 10.30 | 26.00 | 42.80 |
| Modulus of elasticity in tension (ISO 527) [N/mm$^2$] | 2400 | 2140 | 2040 | 1940 | 1790 | 1475 | 2190 | 2110 | 2085 | 1930 | 1580 |
| ΔMVR hydrolysis after 1 day (95° C./99% RH) [%] | 5 | 52 | 256 | 346 | 434 | 644 | 16 | 73 | 125 | 189 | 240 |

The invention claimed is:

1. A composition comprising:
   A) 50 to 95 parts by weight of at least one polymer selected from the group consisting of aromatic polycarbonate and aromatic polyestercarbonate,
   B) 5 to 50 parts by weight of at least one branched polyester, the polyester being derived from succinic acid and butanediol,
   C) 0 to 20 parts by weight of graft polymer,
   D) 0 to 20 parts by weight of vinyl (co)polymer and/or polyalkylene terephthalate,
   E) 0 to 30 parts by weight of additives, the parts by weight being standardized to the total weight of the composition;
   wherein the weight-average molecular weights Mw of component B are between 80 and 500 kg/mol, determined by gel permeation chromatography against polystyrene as reference.

2. The composition according to claim 1, comprising:
   A) 60 to 90 parts by weight of at least one polymer selected from the group consisting of aromatic polycarbonate and aromatic polyestercarbonate,
   B) 10 to 40 parts by weight of at least one branched polyester, the polyester being derived from succinic acid and butanediol,
   C) 0 to 15 parts by weight of graft polymer,
   D) 0 to 15 parts by weight of vinyl (co)polymer and/or polyalkylene terephthalate,
   E) 0.1 to 15 parts by weight of additives, the parts by weight being standardized to the total weight of the composition.

3. The composition according to claim 1, comprising:
   A) 65 to 85 parts by weight of at least one polymer selected from the group consisting of aromatic polycarbonate and aromatic polyestercarbonate,
   B) 15 to 35 parts by weight of at least one branched polyester, the polyester being derived from succinic acid and butanediol,
   C) 0 to 10 parts by weight of graft polymer,
   D) 0 to 10 parts by weight of vinyl (co)polymer and/or polyalkylene terephthalate,
   E) 0.2 to 5 parts by weight of additives, the parts by weight being standardized to the total weight of the composition.

4. The composition according to claim 1, wherein the polyester is branched by addition of 1,1,1-trimethylolpropane.

5. The composition according to claim 1, wherein the acid component of the polyester originates from renewable raw materials.

6. The composition according to claim 1, comprising as component E at least one additive selected from the group of flame retardant synergists, anti-dripping agents, lubricants and mould release agents, nucleating agents, stabilizers, antistats, dyes, pigments and fillers and reinforcing agents.

7. A process for producing injection-moulded or thermoformed shaped bodies comprising the composition as claimed in claim 1.

8. A shaped body obtained from compositions according to claim 1.

9. The composition according to claim 1, wherein the polyester is branched by addition of 0.1 to 0.9 wt. % of a branching agent.

10. The composition according to claim 1, wherein the polyester is branched by addition of 0.2 to 0.6 wt. % of 1,1,1-trimethylolpropane.

11. The composition according to claim 1, wherein the weight-average molecular weights Mw of component B are between 80 and 400 kg/mol, determined by gel permeation chromatography against polystyrene as reference.

12. A composition consisting of:
A) 50 to 95 parts by weight of at least one polymer selected from the group consisting of aromatic polycarbonate and aromatic polyestercarbonate,
B) 5 to 50 parts by weight of at least one branched polyester, the polyester being derived from succinic acid and butanediol,
C) 0 to 20 parts by weight of graft polymer,
D) 0 to 20 parts by weight of vinyl (co)polymer and/or polyalkylene terephthalate,
E) 0 to 30 parts by weight of additives, the parts by weight being standardized to the total weight of the composition,
wherein the weight-average molecular weights Mw of component B are between 40 and 500 kg/mol, determined by gel permeation chromatography against polystyrene as reference.

13. The composition according to claim 11, wherein the polyester is branched by addition of 0.2 to 0.6 wt. % of 1,1,1-trimethylolpropane.

* * * * *